Aug. 14, 1934.  M. KLEIN  1,970,044
FOLDING SPECTACLES
Filed Dec. 30, 1931
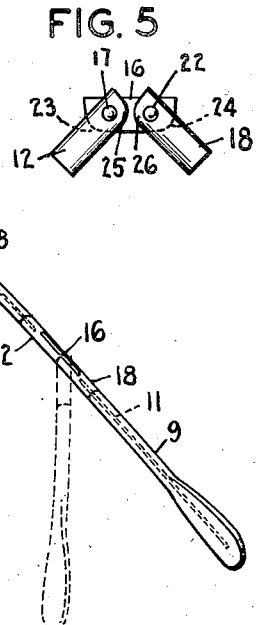
FIG. 5
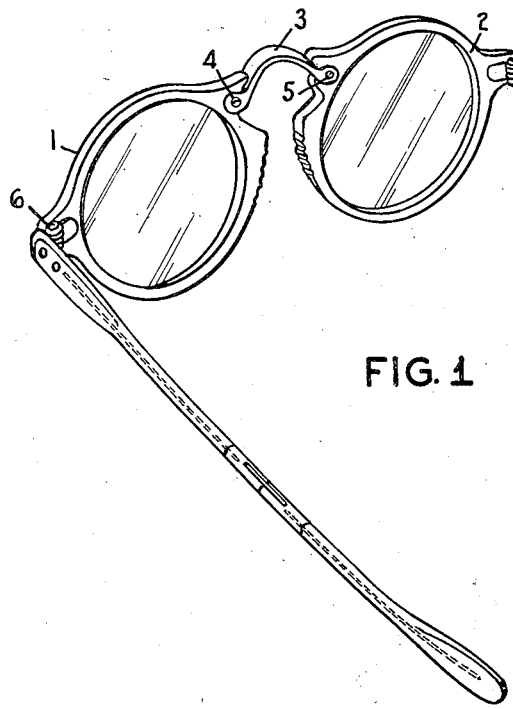
FIG. 1
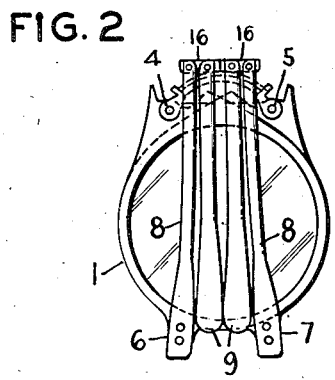
FIG. 2
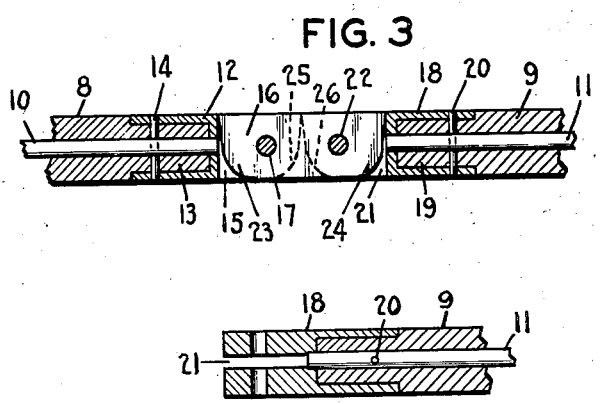
FIG. 3
FIG. 4
INVENTOR
Morris Klein
BY his ATTORNEY
Thomas Howe Patented Aug. 14, 1934

1,970,044

UNITED STATES PATENT OFFICE 1,970,044

FOLDING SPECTACLES

Morris Klein, Brooklyn, N. Y.

Application December 30, 1931, Serial No. 583,860

6 Claims. (Cl. 88—52)

This invention relates to improved frames for spectacles which may be folded into a compact space when not in use and may be unfolded and used as ordinary spectacles when extended into unfolded position.

The main object of the invention is to provide a spectacle frame jointed so that it may be folded as desired and with the joints, particularly in the temples, such that a smooth finish will be obtained, thereby improving the appearance, and the parts will be firmly and accurately held in position when in use.

A further object of the invention is to provide a foldable temple mainly of non-metallic material, such as tortoise shell, celluloid or the like, which temple has the general appearance of being of non-metallic material, with metal joint parts such that the temple when extended will be substantially smooth and continuous and the engaging parts at the joint being of metal, they may be accurately fitted and will resist wear so that the parts are firmly held and will not become loosened by wear. Celluloid and similar materials are not adapted to be accurately fitted and are susceptible to wear whereby the parts become loose.

Other and ancillary objects of the invention will appear hereinafter.

In the accompanying drawing which illustrates the invention—

Fig. 1 is a perspective view of folding spectacles embodying the invention, extended into position for use;

Fig. 2 is a top plan view of the spectacles in folded condition;

Fig. 3 is a vertical axial section through a temple, on an enlarged scale, showing the temple joint and adjacent parts of the temple, the ends of the temple being broken away;

Fig. 4 is an axial sectional view, 90° removed from that of Fig. 3, of one of the joint parts, and Fig. 5 is a fragmentary view showing in side elevation the temple joint in bent position.

Referring to the drawing, the spectacle frame comprises the lens rims 1 and 2 of celluloid and the metal bridge 3 pivoted to the rims at 4 and 5. Temples are hinged to the rims by metal hinges 6 and 7. The temples are duplicates so that a description of one is a description of each. Each temple comprises the two parts 8 and 9 being mainly of celluloid but having the metal cores 10 and 11. To the adjacent ends of the parts 8 and 9 are secured metal joint parts whereby the temple is jointed. The joint part secured to the temple part 8 is a metal piece 12 having an exterior contour corresponding to that of the temple part to which it is secured, and is of substantially the same size, so that the metal joint part forms a smooth continuation of the celluloid temple. The joint part 12 has a socket 13. The celluloid of the temple part 8 is cut down so as to fit in the socket 13, the exterior of the celluloid forming a smooth joint with the metal joint part, and is held therein by a rivet 14 passing through the walls of the socket and the celluloid exterior and metal core of the temple part. The joint part 12 also has a slot 15 adapted to receive the metal plate 16 which is secured therein by the pivotal rivet 17. The joint part 18 secured to the temple part 9 is the same as the piece 12 and comprises the socket 19 into which the reduced end of the temple part 9 fits and is secured by the rivet 20 passing through the socket walls and the temple including the metal core 11, the celluloid surface of the temple part and the metal surface of the joint part corresponding in size and contour so that each forms a smooth continuation of the other. The joint part 18 also has the slot 21 in which the plate 16 is pivotally secured by a rivet 22. It will be observed that the lower corners of the plate 16 are cut away on the curves 23 and 24 and that the lower ends of the joint parts 12 and 18 are cut away on the curves 25 and 26 so that a knuckle joint is formed whereby the extremity 9 of the temple may be turned downwardly with relation to the temple part 8, as indicated in dotted lines in Fig. 1, about an axis substantially at right angles to the axis of the hinge 7 but, on the other hand, the part 9 cannot be moved in the other direction beyond the position where it is substantially in line with the temple part 8 as shown in full lines in Fig. 1. These properties of the joint more clearly appear from Fig. 3. It will be seen that by this construction a temple is provided which, although jointed, is substantially smoothly continuous when extended and by reason of the fact that all the contacting parts of the joint are of metal which may be accurately fitted and resists wear, whereas celluloid is not adapted to accurate fitting and is not wear resisting, the parts are firmly, accurately and durably held in position.

With the construction of frame as described, the lens rims and bridge are held in the relative positions as shown in Fig. 1 when in use by the presence of the wearer's nose between the rims, and the temples extended into the position as shown by the full lines of Fig. 1 pass alongside the head of the wearer. When the spectacles are not in use they may be folded into the compact condition as shown in Fig. 2 by folding the parts of each temple alongside each other, turning the folded temples about the hinges 6 and 7 until they overlie the rims and turning the rims about the pivots 4 and 5 until they are in registry with each other.

While the invention has been illustrated in what is considered its best application it may have other embodiments without departing from its spirit and is not therefore limited to the structures shown in the drawing.

What I claim is:

1. In a spectacle frame, the combination with rims for the lenses, of a bridge connecting said rims and a temple mainly of non-metallic material, hinged to each of said rims, each of said temples being of a plurality of pieces, adjacent pieces being connected by a knuckle joint, said knuckle joint comprising two similar metal parts abutting each other to prevent further turning and each comprising a socket and a slot, the said socket having secured within it a temple-piece end of which the non-metallic material is reduced, the exterior of the metal part being of substantially the same size and contour as the temple piece whereby a smooth continuous surface exists, and a metal plate in the slots of the metal joint parts and pivoted to each of said parts.

2. In a spectacle frame, the combination with rims for the lenses, of a bridge connecting said rims and a temple mainly of non-metallic material hinged to each of said rims, each of said temples being of a plurality of pieces, adjacent pieces being connected by a knuckle joint, said knuckle joint comprising two similar metal parts each comprising a socket and a slot, the said socket having secured within it a temple-piece end of which the non-metallic material is reduced, the exterior of the metal part being of substantially the same size and contour as the temple piece whereby a smooth continuous surface exists, and a metal plate in the slots of the metal joint parts and pivoted to each of said parts, the axis of said joint being substantially at right angles to the axis of the hinge connecting the temple with the rim.

3. In a spectacle frame, the combination with rims for the lenses, of a bridge connecting said rims and a temple mainly of non-metallic material, hinged to each of said rims, each of said temples being of a plurality of pieces, adjacent pieces being connected by a knuckle joint, said knuckle joint comprising two similar metal parts abutting each other to prevent further turning and each comprising a socket and a slot, the said socket having secured within it a temple-piece end of which the non-metallic material is reduced, the exterior of the metal part being of substantially the same size and contour as the temple piece whereby a smooth continuous surface exists, and a metal plate in the slots of the metal joint parts and pivoted to each of said parts, the lower corners of said plate and adjacent joint parts being rounded to permit bending of the joint.

4. In a spectacle frame, the combination with rims for the lenses, of a bridge connecting said rims and a temple mainly of non-metallic material, hinged to each of said rims, each of said temples being of a plurality of pieces, adjacent pieces being connected by a knuckle joint, said knuckle joint comprising two similar metal parts each comprising a socket and a slot, the said socket having secured within it a temple-piece end of which the non-metallic material is reduced, the exterior of the metal part being of substantially the same size and contour as the temple piece whereby a smooth continuous surface exists, and a metal plate in the slots of the metal joint parts and pivoted to each of said parts, the axis of said joint being substantially at right angles to the axis of the hinge connecting the temple with the rim, the temple pieces each having a metal core, and means for securing each joint part to a temple piece, said means passing through the core, and the lower corners of said plate and adjacent joint parts being rounded to permit turning of the joint into folded position.

5. A temple for spectacles, said temple being mainly of non-metallic material, comprising in combination a plurality of pieces, a knuckle joint connecting adjacent pieces, said knuckle joint comprising two similar metal parts each comprising a socket and slot, the said socket having secured within it a temple piece end of which the non-metallic material is reduced, the exterior of the metal part being of substantially the same size and contour as the temple piece whereby a smooth continuous surface exists, and a metal plate in the slots of the metal joint parts and pivoted to each of said parts.

6. A spectacle temple mainly of non-metallic material comprising in combination a plurality of pieces, a knuckle joint connecting adjacent pieces, said knuckle joint comprising two similar metal parts each comprising a socket and a slot, the said socket having secured within it a temple piece end of which the non-metallic material is reduced, the exterior of the metal part being of substantially the same size and contour as the temple piece whereby a smooth continuous surface exists and a metal plate in the slots of the metal joint parts and pivoted to each of said parts, the temple pieces each having a metal core, and means for securing each joint part to a temple piece, said means passing through the core, and the lower corners of said plate and adjacent joint parts being rounded to permit turning of the joint into folded position.

MORRIS KLEIN.